Figure 4:
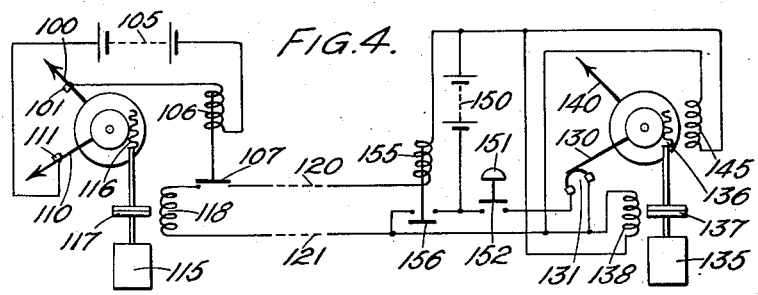

April 2, 1935.    B. H. LEESON ET AL    1,996,677
REMOTE METERING SYSTEM
Filed Oct. 20, 1930    5 Sheets-Sheet 1
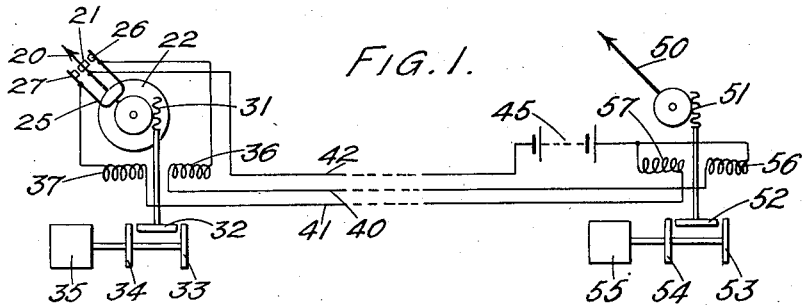
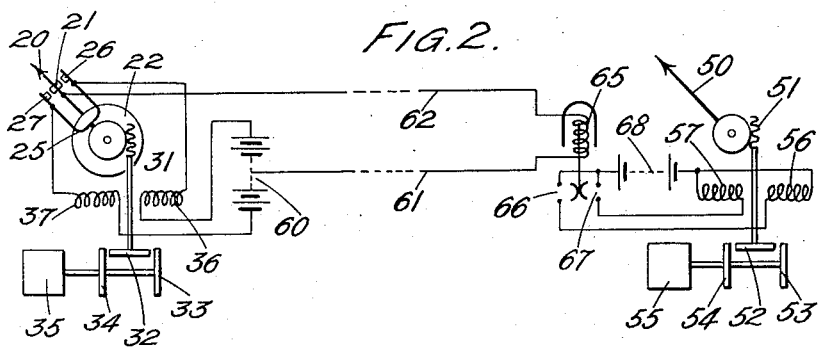
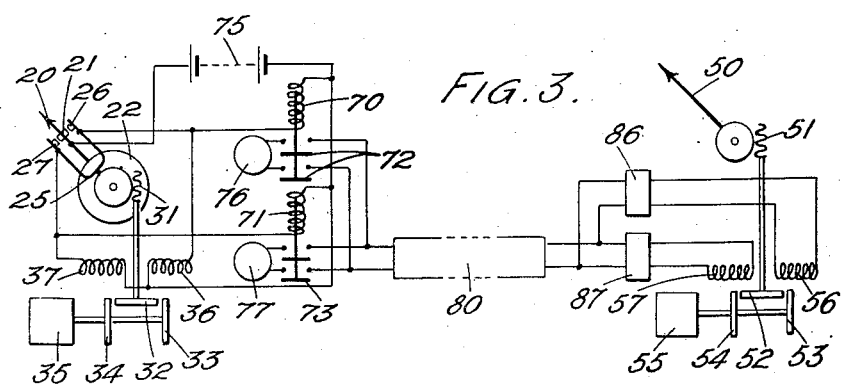
Inventor,
B. H. Leeson, J. A. Harle and D. C. Lambert,
Per,
Watson, Coit, Morse & Grindle,
Atty.

April 2, 1935.   B. H. LEESON ET AL   1,996,677
REMOTE METERING SYSTEM
Filed Oct. 20, 1930   5 Sheets-Sheet 5

Patented Apr. 2, 1935

1,996,677

UNITED STATES PATENT OFFICE 1,996,677

REMOTE METERING SYSTEM

Bruce Hamer Leeson, Tynemouth, and James Alfred Harle, Newcastle-upon-Tyne, and Douglas Edward Lambert, Harpenden, England, assignors to A. Reyrolle & Company Limited, Hebburn-on-Tyne, England, a company of Great Britain Application October 20, 1930, Serial No. 490,081
In Great Britain November 29, 1929

18 Claims. (Cl. 177—351)

This invention relates to a remote metering system for obtaining at a control station an indication of the readings of a meter at a remote station. In the majority of known remote metering systems, apparatus is provided at the remote station for transmitting to the control station a current whose magnitude is dependent on the meter reading, this current magnitude being measured directly or indirectly on a suitably calibrated indicating meter at the control station. This arrangement necessitates the provision, as far as is practicable, of a clean circuit having invariable characteristics for carrying this metering current to the control station, in order that the accuracy of readings may not be seriously interfered with, and consequently imposes limitations both on the type of circuit employed for carrying the metering current and on the arrangement of the remote control and supervisory system if, as is often the case, the remote metering system forms part of such a system.

In the remote metering system according to the invention a device moving over the meter scale at the remote station and an indicator device moving over a corresponding scale at the control station are driven at corresponding speeds, and means are provided whereby the two devices are started simultaneously at corresponding scale positions and are stopped simultaneously when the first device reaches the position occupied by the meter pointer. Preferably the two devices are mechanically driven through clutches from synchronously rotating driving elements (such for example as constant speed electric or other drives or electric motors maintained in synchronism with one another), the clutches being electrically controlled by signalling currents transmitted at the appropriate moments from one station to the other.

In one group of arrangements according to the invention the indicator device is caused continuously to follow the movements of the meter pointer. This may be achieved by arranging that a change of position of the meter pointer automatically causes the two devices to be started up so that they will move to positions corresponding to the new position of the pointer. Thus the clutches may be arranged as reversing clutches so that the two devices will be driven in the forward or the reverse direction in accordance with the direction in which the meter pointer has changed its position, the reversing clutches preferably each being electromagnetically operated by two coils which are energized respectively when the meter pointer moves in the forward direction and when the meter pointer moves in the reverse direction.

Alternatively the desired meter reading indications may be obtained intermittently either at the will of the operator or automatically at predetermined intervals. In this case the arrangement may be such that after the desired indication has been given the two devices automatically return to their zero positions, where they remain irrespective of any movements of the meter pointer until a new indication is to be obtained. With such an arrangement means are preferably provided for preventing the two devices from being started up to give a new indication unless both devices are in their zero positions. The indicator device may be provided with an idle pointer or like member which is held in the indicating position when the device returns to its zero position, so that a record is kept of the last indication obtained. In certain instances, as for example with transformer tap position meters, it is desirable to provide means both at the control station and at the remote station for initiating the simultaneous starting up of the two devices, in order that an important change effected at the remote station without the knowledge of the control station operator may be at once recorded at the control station.

It will be appreciated that with the arrangement according to the invention the desired indication is obtained as a measure of the time interval between two signals transmitted from one station to the other, so that any form of connecting circuit between the two stations may be employed which is capable of transmitting a current signal substantially instantaneously. Thus if a complete metallic pilot circuit is available D. C. signalling currents may be used. Alternatively, the signalling currents may be transmitted over an A. C. channel of communication between the stations, i. e. a circuit, such as a long distance telephone circuit, which may include capacitative or inductive couplings or repeater or amplifier stations. Again the transmission of the starting and stopping signals may be effected by means of high frequency currents with wired or wireless or wired-wireless transmission, either by direct transmission of such currents or by modulating a carrier-wave system at suitable frequencies.

Figure 5:
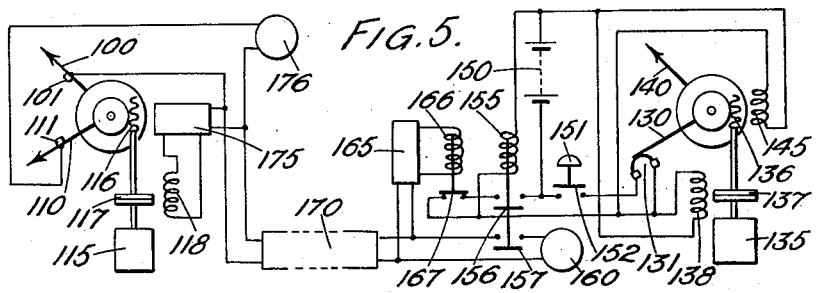
Figure 6:
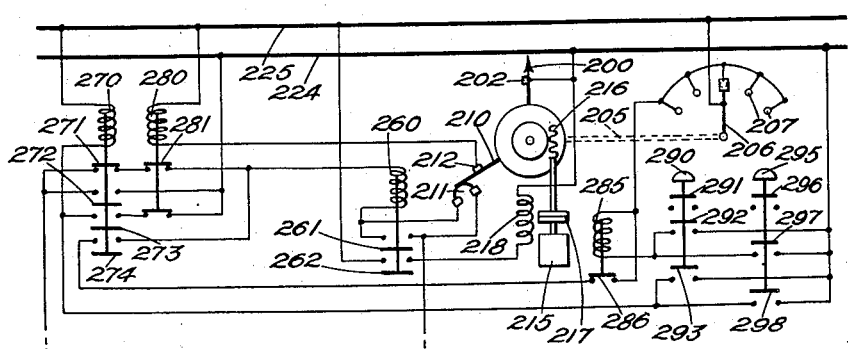
Figure 7:
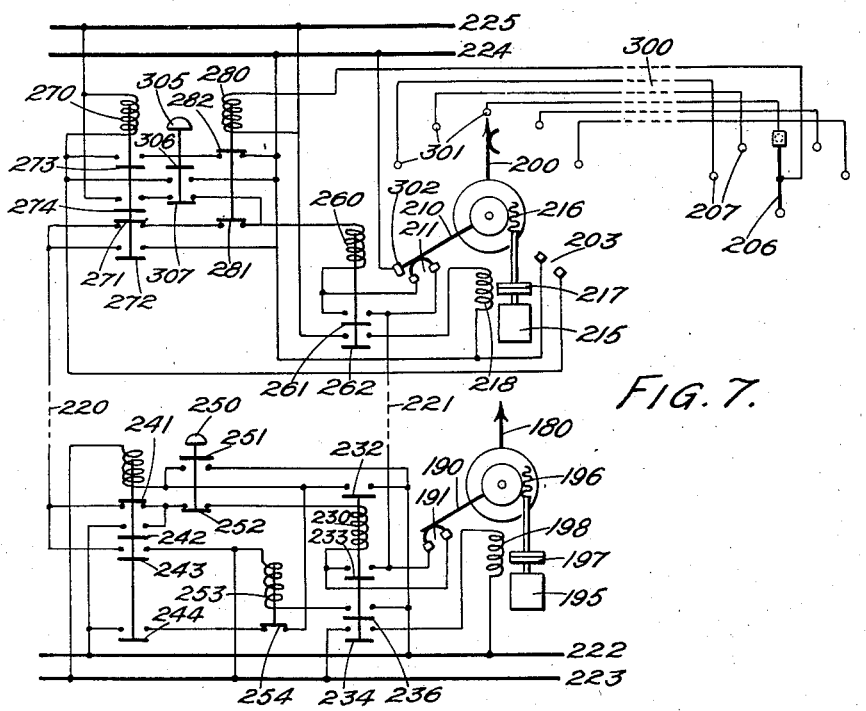
Figure 8:
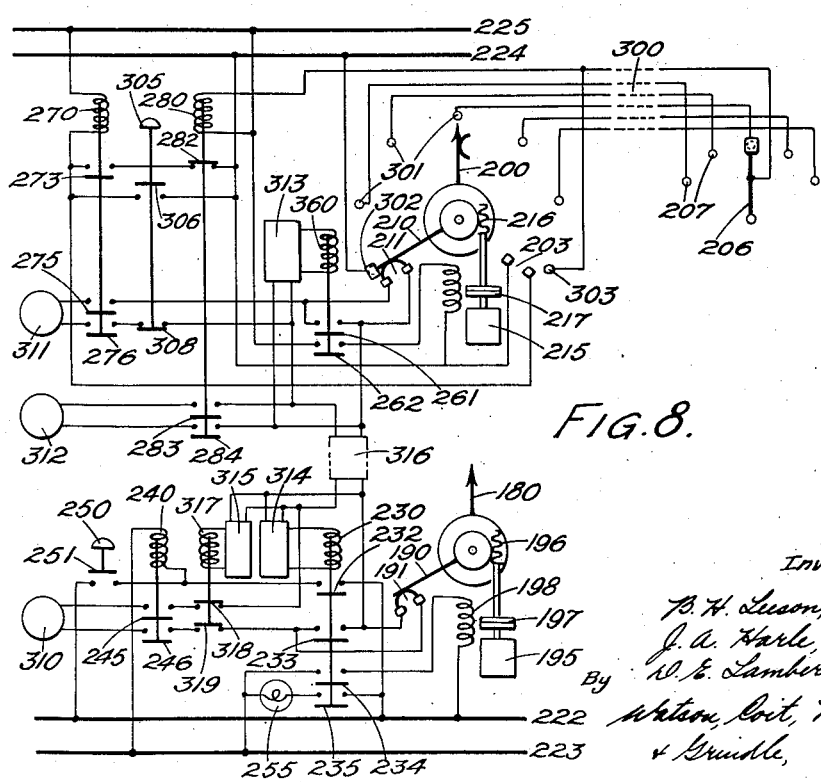
Figure 9:
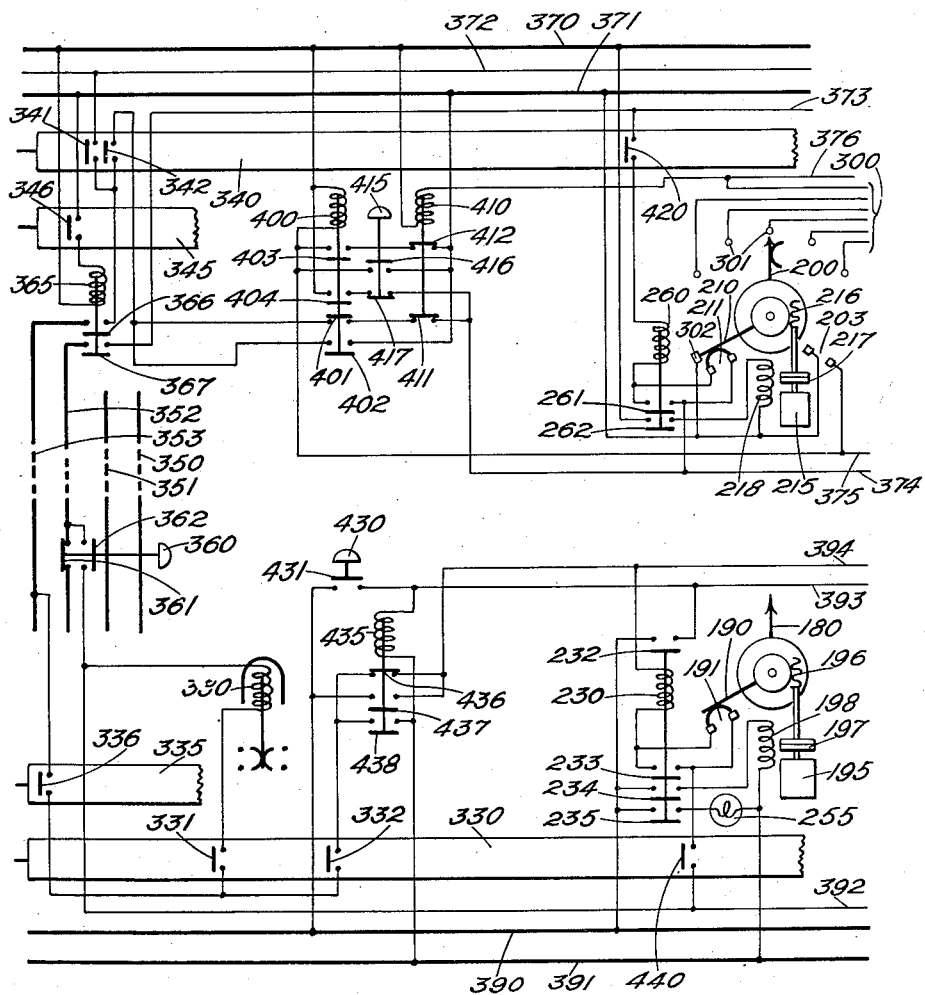
Figure 10:
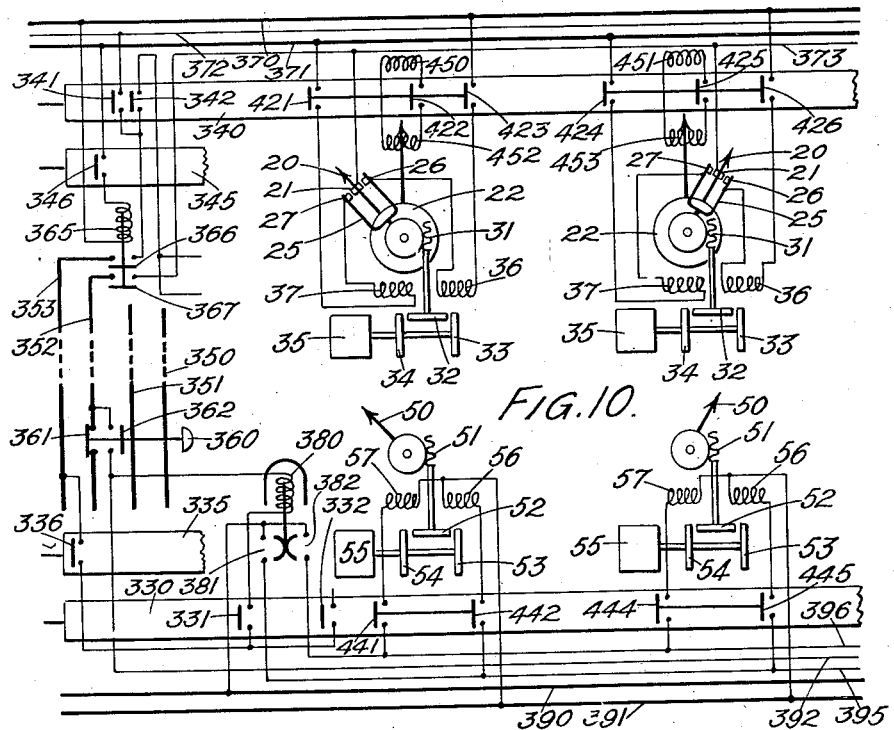
Figure 11:
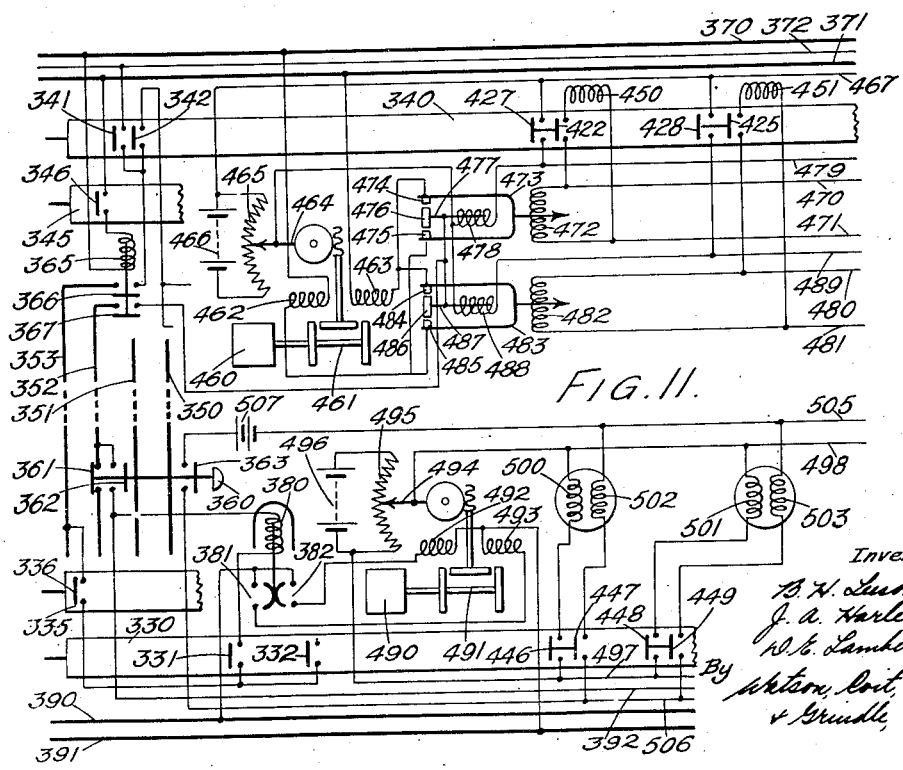

The invention may be carried into practice in various ways, but some convenient practical arrangements according thereto are illustrated diagrammatically in the accompanying drawings, in which Figure 1 shows a remote metering arrangement utilizing D. C. signalling currents transmitted over a three-wire pilot circuit, in which a continuous indication of the meter readings is given at the control station, Figure 2 is a modification of Figure 1 employing a two-wire pilot circuit, Figure 3 is a further modification of Figure 1 in which high frequency signalling currents are employed, Figure 4 shows an arrangement utilizing D. C. signalling currents wherein intermittent indications of the meter readings can be obtained at will at the control station, Figure 5 illustrates the arrangement of Figure 4 modified to employ H. F. signalling currents, Figure 6 shows a preferred form of the arrangement of Figure 4 (including provision for initiating the indication from either end) as applied to the remote indication of a transformer tap position meter, Figure 7 illustrates a modified form of the arrangement of Figure 6, Figure 8 shows a further modification of Figure 6 utilizing high frequency signalling currents, Figure 9 illustrates an adaptation of the arrangement of Figure 6 for inclusion as part of a selective remote control and supervisory system for a power substation, and Figures 10 and 11 show two alternative adaptations of the arrangement of Figure 2 for inclusion in such a system.

In the arrangement shown in Figure 1 the pointer 20 of the remote station meter (of which only the movable parts are shown for the sake of clearness) is provided with a contact 21 located between two contacts 26, 27 on a timing device 25 mounted coaxially with the member 22 carrying the meter pointer 20. The contact 21 normally remains out of engagement with the two contacts 26 and 27, but movement of the meter pointer in either direction will at once cause engagement with one of the two contacts. It will be appreciated that converse arrangement of a single contact on the timing device between two contacts on the meter pointer could equally well be employed.

The timing device 25 is driven through suitable gearing indicated at 31 from the driven member 32 of a reversing clutch, whose driving members 33, 34 are directly coupled to a constant speed driving element 35 which may consist of a clockwork mechanism, or of a synchronous motor driven from a constant frequency A. C. supply, or of a phonic motor controlled by tuning forks or valve generators. The reversing clutch 32, 33, 34 is normally in a neutral position but can be electromagnetically operated to drive the timing device 25 in a forward or in a reverse direction over the meter scale by means respectively of two coils 36, 37, which may be termed for convenience the "forward" coil and the "reverse" coil. One side of the forward coil 36 is connected to the contact 26 and one side of the reverse coil 37 to the contact 27. The other sides of the two clutch coils and the meter pointer contact 21 are respectively connected to three pilot wires 40, 41, 42 extending to the control station.

At the control station there is provided an indicator having a scale calibrated to correspond with the remote station meter scale. A timing device 50, which constitutes the pointer of the indicator (the other parts of the indicator being, for simplicity, omitted from the drawings) is rotated through suitable gearing 51 from the driven member 52 of a reversing clutch, whose driving members 53, 54 are connected to a constant speed driving element 55 (arranged to rotate at the same speed as the remote station driving element 35), the clutch 52, 53, 54 being electromagnetically controlled by a forward coil 56 and a reverse coil 57. One side of the forward coil 56 is connected to the pilot wire 40 leading to the remote station forward coil 36, and one side of the reverse coil 57 is likewise connected through the pilot wire 41 to the remote station reverse coil 37, whilst the other sides of the coils 56, 57 are connected to one pole of a battery 45 whose other pole is connected to the pilot wire 42.

Thus assuming the apparatus at rest with the meter pointer 20 and the indicator pointer 50 in corresponding scale positions, any change in position of the meter pointer 20, say in the forward direction, will cause engagement of its contact 21 with one of the contacts 26 on the timing device 25 and will thus complete a circuit over the pilot wires 40, 42 to the two forward coils 36, 56. This will cause operation of the two reversing clutches to drive the two timing devices 25, 50 at corresponding speeds in the forward direction over their scales. As soon as the remote station timing device 25 reaches the new position of the meter pointer 20, the contacts 21, 26 will open to deenergize the forward coils 36, 56 and thereby to bring the two timing devices 25, 50 to rest in the new position. Thus the indicator pointer 50 will continuously follow the movements of the meter pointer 20 and will at all times give a correct indication of the position of the meter pointer.

The arrangement of Figure 2 differs from that of Figure 1 in that the D. C. signalling currents to effect starting and stopping of the two timing devices are transmitted over a two-wire pilot circuit. For this purpose the only changes necessary are in the energizing circuits of the clutch coils, the same reference letters as in Figure 1 being used for the other parts of the arrangement. At the remote station the forward clutch coil 36 is connected on one side as before to the contact 26 but on the other side it is in this case connected to one pole of a local battery 60, the reverse coil 37 being likewise connected between the contact 27 and the other pole of the battery 60. The mid-point of the battery 60 is connected to one pilot wire 61 and the meter pointer contact 21 is connected to the other pilot wire 62. At the control station the two pilot wires 61, 62 are respectively connected to the two sides of a polarized relay 65, which makes one or other of two sets of contacts 66, 67 in accordance with the polarity of the current received over the pilot wires. These two sets of contacts 66, 67 respectively control the energizing circuits from a local battery 68 of the forward and reverse coils 56, 57.

Thus a change in position of the meter pointer 20, say in the forward direction, will close contacts 21, 26 to energize the forward clutch coil 36 and at the same time to transmit over the pilot wires 61, 62 a current of one polarity, which will cause the polarized relay 65 to close the contacts 66 and energize the forward clutch coil 56. The timing devices 25, 50 will therefore move forward in synchronism to their new positions, when the disengagement of the contacts 21, 26 will cause the clutch coils to be deenergized and will stop the movement. A movement of the meter pointer 20 in the reverse direction will energize the reverse coil 37 and transmit a current of the opposite polarity to the polarized relay 65 to energize the reverse coil 57, the circuits being broken as before when the new position is reached.

In the above arrangements the signalling currents which bring about the starting and stopping of the timing devices have been in the form of D. C. currents transmitted over complete metallic pilot circuits. When such pilot circuits are not available, the system can still be carried into practice by using A. C. currents whose frequency can be selected to suit the particular conditions of the case. Thus when telephone circuits (which may include capacitative or inductive couplings and repeater or amplifier stations) are available A. C. currents of audio frequencies may be used, whilst in high frequency wired or wireless or wired-wireless systems the usual radio frequencies may be employed or alternatively the lower range of radio frequencies may be used for modulating carrier waves.

Figure 3 shows such an arrangement, which may be regarded as the A. C. analogue of the arrangements of Figures 1 and 2 and differs from those arrangements solely in respect of the energizing circuits of the clutch coils 36, 37, 56, 57. In this arrangement the contact 26 on the timing device is connected to one side of the forward clutch coil 36 and also to one side of a timing relay 70, the contact 27 being connected to one side of the reverse coil 37 and to one side of a second timing relay 71. The other sides of the coils 36, 37 and of the timing relays 70, 71 are all connected to one pole of a local battery 75, whose other pole is connected to the meter pointer contact 21. The contacts 72 of the relay 70 and the contacts 73 of the relay 71 respectively control the connections of two A. C. generators 76 and 77 to the pilot or other circuit, which is indicated at 80 and may have the form of any channel of communication (such as those above referred to) over which A. C. currents can be transmitted. The two generators 76 and 77 generate at different frequencies chosen to suit the type of circuit 80 employed. At the control station the pilot or other circuit 80 is connected to two receivers 86, 87 respectively tuned to the two frequencies and controlling the energization of the two clutch coils 56, 57. The operation of this arrangement will be clear without further description.

The foregoing arrangements have the advantage of giving a continuous indication of the meter readings, but require careful adjustment in view of the fact that any errors that may arise in synchronizing the two movements will be cumulative. In the arangement of Figure 4, the risk of cumulative errors is eliminated, the indications however only being given intermittently, when required.

In the arangement of Figure 4, the remote station meter pointer 100 carries a contact 101 cooperating with a contact 111 on a timing device 110 in controlling the energization from a local battery 105 of a signal back relay 106 having a normally closed contact 107. The timing device 110 can be driven over the meter scale from the zero position against the action of a spring (not shown) by a constant speed driving element 115 acting through suitable gearing 116 and a clutch 117 electromagnetically controlled by a coil 118. The contact 107 controls the connection of the clutch coil 118 to two pilot wires 120, 121 extending to the control station.

The apparatus at the control station includes a timing device 130 similar to that at the remote station, which can be driven from the zero position against the action of a spring (not shown) by a constant speed driving element 135 (rotating at the same speed as the remote station element 115) through gearing 136 and a clutch 137 electromagnetically controlled by a coil 138. Coaxial with the timing device 130 is an indicator pointer 140 movable over a scale (not shown) corresponding to the remote meter scale. The indicator pointer 140 is driven over the scale against the action of a zero-biasing spring by the timing device 130 and is provided with an electromagnetically released clamp for holding it in its indicating position when not engaged by the timing device. The spring and the clamp are omitted from the drawings for the sake of simplicity, but the release coil controlling the clamp is indicated at 145. The release coil 145 and the clutch coil 138 are connected in parallel to one another across the pilot circuit 120, 121, this circuit being energized from a local battery 150 in the control station under the control of the contact 152 of a hand-operated switch 151 and also of contacts 131 so operated by the timing device 130 as to be closed only when the timing device is in the zero position. An auxiliary relay 155 is connected in series with the pilot circuit 120, 121, and when energized closes its contact 156 to shunt the hand-switch and zero-interlock contacts 152, 131.

Thus in the normal rest position of the apparatus, the meter pointer 100 is in its reading position and the indicator pointer 140 is clamped in the position to which it was moved at the previous indication, whilst the two timing devices 110, 130 are in their zero positions with their clutches 117, 137 disengaged. If now it is desired to obtain a new indication of the meter reading, the hand-switch 151 is operated, and, since the zero interlock contacts 131 are closed, the pilot circuit is energized from the control station battery 150. This has the effect of energizing the release coil 145 to release the clamp on the indicator pointer and of operating the two clutch coils 118, 138, the auxiliary relay 155 also being operated to hold the circuit closed in spite of the opening of the zero-interlock contacts 131 and the release of the hand-switch 152. The two timing devices 110, 130 are now driven synchronously over their scales, and when the remote station device 110 reaches the meter reading position, the contacts 101, 111 close and energize the signal-back relay 106 to open its contact 107 and break the pilot circuit. This deenergizes the remote station clutch coil 118 and the auxiliary relay 155, which at once deenergizes the control station clutch coil 138 and causes the release coil 145 to apply the clamp to the indicator pointer 140. The two timing devices 110, 130 now reset themselves under the action of their springs, that at the remote station being adjusted to reset to its zero position slightly more quickly than that at the control station, in order to ensure proper operation of the zero interlock contacts 131. The indicator pointer 140 is thus left in the indicating position, in which it remains clamped until a new indication is to be obtained. It will be appreciated that a new indication may be initiated automatically (for example at predetermined regular intervals) if desired, instead of by means of the hand-switch.

Figure 5 illustrates the A. C. analogue of the arrangement of Figure 4 and will be described only in so far as it differs therefrom. Thus at the control station the clutch coil 138, the release coil 145, and the auxiliary relay 155 are in this case all directly energized from the local battery 150 under the control of the hand-switch and zero-interlock contacts 152, 131, and the auxiliary relay is provided with an extra contact 157 which acts to connect an A. C. generator 160 to the pilot or other circuit 170. The contact 156 of the auxiliary relay 155 in this arrangement has in series with it the normally closed contact 167 of a timing relay 166 in the shunt circuit across the hand-switch and zero-interlock contacts 152, 131, the timing relay being operated by a receiver 165 connected across the pilot or other circuit 170 and tuned to a frequency different from that of the generator 160.

At the remote station the pilot or other circuit 170 is connected to a receiver 175, tuned to the frequency of the control station generator 160 and directly controlling the energization of the clutch coil 118, and is also connected through the contacts 101, 111 to an A. C. generator 176 generating at the frequency to which the control station receiver 165 is tuned. The remote station generator 176 thus corresponds to the signal back relay 106 of Figure 4, and acts through the timing relay 166 at the control station to effect the stopping of the movements of the two timing devices 110, 130. In other respects the operation of this arrangement is generally similar to that of the arrangement of Figure 4 and will be clear without further description.

The arrangements of Figures 4 and 5 are of especial value for indicating the readings of a meter whose pointer moves in steps and always occupies one of a finite number of positions, such for instance as a transformer tap position meter. With such meters a change of position will generally result from some definite switching or like operation, which may take place automatically or manually under the control of an operator at the transformer station, so that the control station operator may be unaware of the change. It will be apparent that in such circumstances the control station indicator may give a false reading, and it is consequently desirable so to arrange the system that a reindication can be initiated from the remote station when such a change occurs as well as from the control station. Figures 6, 7 and 8, which may be regarded as modifications of the arrangements of Figures 4 and 5, illustrate three alternative methods of effecting such two-way operation, and will now be described, for convenience with reference to a transformer tap position meter. In Figure 6 it is assumed that the transformer is disposed at the remote station adjacent to the meter, so that the meter pointer can be directly driven from the tap-changing mechanism or from indicating mechanism associated therewith, whilst in Figures 7 and 8 the case is taken of a transformer distant from the remote station meter.

In the arrangement of Figure 6, the control station indicator, as in the arrangement of Figure 4 is provided with an indicator pointer 180, which can be clamped in its indicating position under the control of a release coil 185, and with a timing device 190 which is driven from the zero position (wherein it controls zero-interlock contacts 191) to the indicating position by a constant speed driving element 195 through gearing 196 and a clutch 197 controlled electromagnetically by a coil 198. The remote station meter, whose pointer 200 is directly driven through mechanism indicated at 205 by a contact arm 206 associated with the adjacent transformer tap-changing mechanism, is likewise provided with a timing device 210 which is driven by a constant speed driving element 215 through gearing 216 and a clutch 217 controlled by a coil 218 from the zero position to the reading position where its contact 212 engages with a contact 202 on the meter pointer 200, but in this case the remote station timing device 210 also acts in its zero position to close interlock contacts 211.

The control station and the remote station are connected together by two pilot wires 220, 221 and are each provided with a local D. C. source of power 222, 223 or 224, 225. The control station is also provided with an operating relay 230 having contacts 231—235, an initiating relay 240 having contacts 241, 242, 243, a hand-switch 250 with its contact 251 and an indicating lamp 255. The remote station is provided with an operating relay 260 with contacts 261, 262, an initiating relay 270 with contacts 271—274, a signal-back relay 280 with contacts 281, 282, an auxiliary relay 285 with its contact 286 and two hand-switches 290, 295, respectively, with contacts 291—293 and 296—298, these two switches conveniently being the switches which control the tap-changing apparatus.

The two pilot wires 220, 221 form part of a normally closed loop circuit which may be traced from the pilot wire 220 through the control station initiating relay contact 241, the control station operating relay 230 and the control station zero interlock contacts 191 to the pilot wire 221, and thence through the remote station zero interlock contacts 211, the remote station operating relay 260 and the contacts 281, 271 on the signal-back relay and the remote station initiating relay back to the pilot wire 220. The two operating relays 230, 260 each have a normally open contact 234 or 262 controlling the energizing circuit from the adjacent D. C. busbars of the clutch coil 198 or 218, and a further normally open contact 233 or 261 shunting the zero interlock contacts 191 or 211. The other contacts 231, 232, 235 of the control station operating relay 230 act respectively to energize the release coil 185, to energize the initiating relay 240 and to light the indicating lamp 255. The control station hand-switch contact 251 is in parallel with the contact 232 in the energizing circuit of the initiating relay 240, which acts when operated to break the normal loop circuit at contact 241 and to connect the two parts of that circuit to the two D. C. busbars 222, 223. The remote station initiating relay 270 similarly acts at contact 271 to break the loop circuit and at contacts 272 and 274 to connect the two parts of the loop circuit to the two D. C. busbars 224, 225. Contact 273 is in series with contact 282 on the signal-back relay 280 (which is energized on engagement of the contacts 202, 212) in a holding circuit for the initiating relay, the main energizing circuit of which is controlled by one or other of the hand-switch contacts 293, 298. The circuit from contact 274 to the D. C. busbar 225 is taken through the contact arm 206 on the tap-changing mechanism and the associated contacts 207 and also through the contact 286 of the auxiliary relay 285, whose energizing circuit is controlled by the contacts 206, 207 and by the hand-switch contacts 292, 297. The remaining hand-switch contacts 291, 296 respectively control circuits (not shown) for effecting raise and lower operation of the tap-changing mechanism.

The operation of this arrangement will now be described, first of all with reference to a re-indication initiated from the control station for checking purposes. To effect such re-indication the control station operator depresses his hand-switch 250 to energize the control station initiating relay 240. This relay on operating breaks the loop circuit at contact 241 and closes contacts 242, 243 to inject current into the loop circuit from the control station D. C. busbars 222, 223. Since the zero interlock contacts 191, 211 at both stations are at this stage closed, the energization of the loop circuit causes operation of both operating relays 230, 260. The control station operating relay 230 short-circuits the zero-interlock contacts 191 at contact 233, lights the indicating lamp 255 at contact 235, releases the clamp on the indicating pointer 180 at contact 231, makes the holding circuit for the initiating relay 240 at contact 232 (so that the hand-switch 250 can be released as soon as the lamp 255 lights) and energizes the clutch coil 198 at contact 234, whereby the clutch 197 is engaged to allow the constant speed element 195 to drive the timing device 190 and the indicator pointer 180 over the indicator scale. The remote station operating relay 260 short-circuits the zero-interlock contacts 211 at contact 261 and energizes the clutch coil 218 at contact 262, so that the constant speed element 215 drives the timing device 210 over the meter scale from the zero position to the reading position. When the reading position is reached the contacts 202, 212 engage and energize the signal-back relay 280 to break the loop circuit at contact 281 and thus to deenergize the two operating relays 230, 260, as the result of which the clutches 197, 217 are disengaged and the two timing devices 190, 210 reset themselves to the zero position, the indicator pointer 180 being clamped in its indicating position. The holding circuit for the control station initiating relay 240 is also broken at contact 232, so that this relay is deenergized and the whole system returns to its normal condition with the indicator pointer correctly set.

If now the remote station operator wishes to change his transformer tap position, he operates the "raise" or "lower" hand-switch 290 or 295. This, besides actuating the tap-changing mechanism, energizes the remote station initiating relay 270 and the auxiliary relay 285. The initiating relay makes its own holding circuit at contact 273, breaks the loop circuit at contact 271, connects the D. C. busbar 224 to one part of the loop circuit, and prepares the connection of the busbar 225 to the other part of the loop circuit, this connection however being broken at contact 286 by the operation of the auxiliary relay 285. As soon as the tap-changing apparatus begins to move, the contact arm 206 moves away from the fixed contact 207 and thus (although deenergizing the auxiliary relay 285) maintains broken the connection of the busbar 225 to the loop circuit until the new transformer tap position is reached. When this position is reached (the hand-switch 290 or 295 meanwhile having been released) current is injected into the loop circuit and the two operating relays 230, 260 perform their functions as in the case of reindication initiated from the control station, the initiating relay 270 being deenergized by the opening of contact 282 when the signal-back relay 280 operates, so that the system finally returns to its normal condition with the indicator pointer 180 held set in the new tap position.

If it should happen that the remote station operator initiates a tap-changing operation whilst a reindication initiated from the control station is in progress (a condition unlikely to occur since the operator would see the reindication in progress and would await its completion) the result would be to break the loop circuit and nullify the effect of the reindication and to start a new reindication as soon as the tap-changing operation is completed.

In the arrangements of Figures 4-6 the clamp on the indicator pointer has been described as electromagnetically released. It will be appreciated, however, that this clamp may alternatively be momentarily released mechanically immediately the timing device leaves its zero position to allow the pointer to return to the zero position, from which it is driven by the device against the frictional force of the clamp.

The control station circuits in the arrangement of Figure 6 may be modified, if desired, so that the energization of the loop circuit does not take place until the hand-switch is released, thus preventing a repetition of the reindicating cycle if the hand-switch is held closed too long. Such a modification is illustrated in the lower part of Figure 7, in the upper part of which the remote station circuits are also modified to deal with the case of a transformer distant from the tap position meter.

In the control station arrangement shown in the lower part of Figure 7, the indicator and the operating relay 230 are arranged as in Figure 6 (the same reference numerals being employed) except for the omission of contact 235 and the indicating lamp 255 and the provision of an extra contact 236 on the relay. Contact 231 and the release coil 185 are also omitted but may be included if an electromagnetic release is desired in preference to a mechanical release. The initiating relay 240 and the hand-switch 250 are also arranged as in Figure 6 except that each is provided with an extra contact 244 or 252. An auxiliary relay 253 is provided, which is energized at contact 236 when the operating relay 230 operates, and whose normally closed contact 254 is in series with contact 244 in an additional holding circuit for the initiating relay 240. The contact 252 on the hand-switch 250 breaks the loop circuit when the hand-switch is depressed. Thus depression of the hand-switch breaks the loop circuit and energizes the initiating relay 240 which makes its own holding circuit at contact 244 through the auxiliary relay contact 254. Nothing further happens until the hand-switch is released, whereupon the loop circuit is energized and the cycle proceeds as before, the auxiliary relay 253 being energized to break the holding circuit when the operating relay 230 operates.

The modification of the remote station circuits shown in the upper part of Figure 7 to deal with the case of a distant transformer will now be described. The tap-changing mechanism is, as before, provided with a contact arm 206, but the cooperating contacts 207 are in this case connected through a group of pilot wires 300 to corresponding contacts 301 provided on the meter in the remote station, the timing device 210 (otherwise arranged as in Figure 6) carrying a contact 302 which can engage with the contacts 301. The contacts 202, 212 on the meter pointer 200 and the timing device 210 are in this case omitted, and the energizing circuit of the signal-back relay 280 is now controlled by the contacts 206, 207, 301, 302. The signal-back relay, whose contacts 281, 282 are arranged as in Figure 6, is thus energized when the timing device 210 reaches the position corresponding to the tap position occupied by the contact arm 206. The meter pointer 200 is in this case driven by the timing device 210 and is clamped in the reading position, when the timing device resets itself, in a manner similar to that for the indicator pointer. The auxiliary relay 285, which controls the connection of the D. C. busbar 225 to the loop circuit, is in this case omitted, this connection being directly controlled by a normally closed contact 307 on a hand-switch 305 (which is operated by the remote station operator when a tap-changing operation is completed) independently of the contacts 206, 207 on the tap-changing mechanism. The other contact 306 on the hand-switch 305 corresponds to the contacts 293, 298 of Figure 6 and controls the energizing circuit of the initiating relay 270. In other respects the main circuits are similar to those of Figure 6, except for the provision of "over-run" contacts 203 on the meter to which further reference will be made later.

The operation of this modification of the remote station circuits in the case of a reindication initiated from the control station is the same as before, with the exception that the operation of the signal-back relay 280 to break the loop circuit and stop the movement is brought about by the engaging of the contact 302 on the timing device 210 with the appropriate contact 301 on the meter. In the case of a reindication initiated from the remote station, the operation of the hand-switch 305 energizes the initiating relay 270 at contact 306 and at contact 307 breaks the connection of the D. C. busbar 225 to the loop circuit, which would otherwise be completed at contact 274 by the operation of the initiating relay. This relay as before makes its own holding circuit at contact 273 through the signal-back relay contact 282. On release of the hand-switch 305, the busbar 225 is connected to the loop ciruit and the cycle proceeds as already described, the timing devices ultimately resetting themselves to the zero position and leaving the indicator pointer and the meter pointer clamped in the indicating position.

In the event of the tap-changing mechanism being operated whilst a reindication cycle is in progress, it is possible that the signal-back relay 280 may not be energized at all. This may happen for instance if the tap position is changed from, say, the fourth position to the third position at a moment when the timing devices happen to be moving from the third position to the fourth position. The over-run contacts 203, above referred to, are provided to deal with such an eventuality. These contacts are closed when the timing device 210 and the meter pointer 200 have passed the last position, and act to energize the initiating relay 270. This first breaks the loop circuit at contact 271 to deenergize the operating relays 230, 260 and return the timing devices to the zero position and then initiates a new reindication cycle.

Figure 8 illustrates an adaptation of the arrangements of Figures 6 and 7 to utilize A. C. currents instead of D. C. currents for starting and stopping the movements. In the arrangement actually illustrated the control station circuits are analogous to those of Figure 6 and the remote station circuits to those of Figure 7, and the same reference numerals as in those figures are employed where applicable. In this arrangement three A. C. generators 310, 311, 312 are provided, two of which 310, 311 disposed respectively at the control station and at the remote station generate at the same frequency (the "first" frequency), whilst the third 312 is disposed at the remote station and generates at a different frequency (the "second" frequency). Three receivers 313, 314, 315, all permanently coupled to the pilot or other circuit 316, are provided, two of which 313, 314 disposed respectively at the remote station and at the control station are tuned to the first frequency, whilst the third 315 at the control station is tuned to the second frequency. The receivers 313, 314 directly control the operating relays 260, 230, whilst the receiver 315 controls an auxiliary relay 317 having normally closed contacts 318, 319 in the connections from the control station generator 310 to the pilot or other circuit 316. This connection, besides including the zero-interlock contacts 191 and the operating relay contact 233 arranged as before, is also controlled by normally open contacts 245, 246 on the initiating relay 240. At the remote station the connection of the first frequency generator 311 to the pilot or other circuit 316 is controlled by the contacts 211, 261 arranged as before, by normally open contacts 275, 276 on the initiating relay 270 and by normally closed contacts 308 on the hand-switch 305. The connection of the second frequency generator 312 to the pilot or other circuit 316 is controlled by normally open contacts 283, 284 on the signal-back relay 280. In other respects the control station circuits and the remote station circuits are arranged respectively as in Figures 6 and 7.

Thus operation of the hand-switch 250 or 305 at either station will connect the first frequency generator 310 or 311 at that station to the pilot or other circuit, and the two first frequency receivers 313, 314 will respond and energize the two operating relays 260, 230. This will, as before, cause the timing devices to move over their scales until the indicating position is reached, when the signal-back relay 280 will be operated to connect the second frequency generator 312 to the pilot or other circuit and to break the holding circuit of the remote station initiating relay 270. The opening of the contacts 275, 276 (if closed) and the operation of the second frequency receiver 315 to cause opening of the contacts 318, 319 will thus disconnect both first frequency generators 310, 311 from the pilot or other circuit 316 and will thus deenergize the two first frequency receivers 313, 314 and consequently also the operating relays 260, 230, so that the movements of the two timing devices are stopped when the indicating position is reached. Owing to the omission in this arrangement of the contact 271 on the initiating relay 270, it is necessary to provide an additional "over-run" contact 303, with which the timing device contact 302 engages to operate the signal-back relay 280 and thereby to return the timing devices to the zero position prior to the commencement of the new reindication cycle initiated by the closing of the over-run contacts 203.

It will be appreciated that the above arrangements fall into two classes, the first of which (Figures 1–3) gives continuous indications, whilst the second (Figures 4–8) is subject to the limitation of giving only intermittent demand indications. Whilst the first class would therefore appear to be preferable, there is a possible drawback associated with it that cumulative errors in indication might result. This can however be overcome by combining an arrangement of the first class with one of the second class.

Such a combined arrangement would normally function as an arrangement of the first class, but at periodic intervals the two timing devices would be automatically reset to their zero positions and released, whereupon they would function as an arrangement of the second class until the correct indicating positions are assumed. The control would then continue as in an arrangement of the first class throughout the next of the periodic intervals. Thus any error which might arise would be cumulative only for the duration of one of the intervals and would be periodically corrected. The manner in which this combined arrangement can be carried into practice will be apparent without detailed description.

The arrangements according to the invention have many applications. Thus for instance they can be applied to the indication of readings of meters having angular scales (such as electrical instruments, gauges etc.) or linear scales (such as water level indicators, chain grate stoker indicators etc.) Generally, the invention is applicable to the indication of the reading of any meter where a movement proportional to the desired indication can be obtained. It will be appreciated that the term "meter" is herein used in a wide sense to include apparatus which whilst actually performing some measuring function are not normally regarded as measuring instruments. As an example of this may be mentioned the applicability of the invention to remote fault position indication in connection with impedance or like protective systems, wherein the usual operation of the protective gear is in effect to measure the distance of a fault in terms of time. In such a case the initial operation of the protective relay in response to a fault could be caused to start the movement of a timing device at a control or indicating station, the device being stopped in the manner of the present invention when the actual relay contacts for tripping the main circuit-breaker are operated. The circuits can be so arranged that, in the event of the fault being cleared by another protective relay elsewhere on the protected circuit, the indication would be rendered ineffective and the timing device reset to its zero position. Thus a control room could be provided with a number of indicators respectively associated with protective relays at the various switching points on the main circuit, and the effect of the clearance of a fault would then be that one indicator (namely that associated with the relay nearest the fault which actually operated its circuit-breaker) would give an indication of the fault position.

One important application of the invention is to remote metering in association with a selective remote control and supervisory system for a power substation. Generally, an arrangement according to the invention can readily be incorporated into any such system in which two pilot wires (or equivalent connections) are freely available for metering purposes when required. Thus for example in the selective remote control system described in the copending application for Letters Patent of the United States of America Serial No. 449,968 standing in the names of two of the present applicants and another, wherein a selector at the control station and a selector at the sub-station are caused to perform corresponding step-by-step selecting movements, each of which is divided up into two "half-notch" movements, provision is made for utilizing the various half-notch positions of the selectors for the establishment of clean metering circuits over two of the pilot wires. In one convenient application of the present invention to such a system, an arrangement of the first class (Figures 1–3) and an arrangement of the second class (Figures 4–8) are both employed, the latter for transformer tap position meters and the former for voltmeters, ammeters, wattmeters etc. Such a combined system is illustrated in Figures 9–11, but for convenience is divided up into separate figures. Thus Figure 9 shows the part of the combined system concerned with the selective indication of the readings of a group of transformer tap position meters in the substation, utilizing at the control station an adaptation of the control station circuits of Figure 6 and at the substation an adaptation of the remote station circuits of Figure 7. Figures 10 and 11 illustrate the part of the combined system concerned with the selective indication of the readings of a group of meters such as ammeters or voltmeters, and show two alternative adaptations of the arrangement of Figure 2.

In a preferred system according to the copending patent application above mentioned, the control station and the substation are each provided with a contact-making rotary selector, to which step-by-step movements are imparted through intermittent gearing by a rotary controlling drum, the selectors and drums being indicated in Figures 9–11 at 330, 335 in the control station and 340, 345 in the substation. The movements of the two rotary drums 335, 345 are controlled (in a manner fully described in the specification of the copending application) by selecting currents transmitted over two of the four pilot wires 350—353 connecting the stations in such a manner that the selectors 330, 340 perform each stepped movement in two parts, and a meters hand-switch in the control station (indicated at 360) acts when operated to arrest the movement of the drums and selectors in the half-notch position, contacts 336, 346 on the drums being closed in each half-notch position.

The substation drum contacts 346 control the energization of a time-lag meter relay 365 in the substation from D. C. bus-bars 370, 371, so that this relay operates its contacts 366, 367, whenever the selecting movement is arrested in a half-notch position. The contacts 366, 367 control the connections of the two pilot wires 353, 352 to metering circuits in the substation. Thus the pilot wire 352 is connected through the contact 367 to a busbar 373 and the pilot wire 353 is connected through the contact 366 to one or other of two contacts 341, 342 on the selector 340, the contacts 341 being closed in all selector half-notch positions associated with ammeters, wattmeters etc. (for which the arrangements of Figures 10 and 11 are operative) and being open in all other selector positions, whilst the contacts 342 are closed in all selector half-notch positions associated with transformer tap position and like meters (for which the arrangement of Figure 9 is operative). The contacts 341 are connected to a D. C. neutral busbar 372, which may for instance be connected to the mid-point of a battery which supplies the D. C. busbars 370, 371. The connections to the contacts 342 will be referred to later.

The control station drum contacts 336 control the connection of the pilot wire 353 to one or other of two contacts 331, 332 on the selector 330, these two contacts being respectively operated in the same selector positions as the two substation selector contacts 341, 342. The meters switch 360, besides controlling the selecting movements as above mentioned, acts at contact 361 to disconnect the pilot wire 352 from its normal remote control connections and then at contact 362 to connect this pilot to a polarized relay 380 and also to a busbar 392. The polarized relay 380, whose other side is connected to the selector contacts 331, forms part of the arrangements of Figures 10 and 11. The control station is also provided with D. C. busbars 390, 391.

The arrangement of Figure 9, which is concerned with the selective indication of the readings of transformer tap position meters, will now be described. This arrangement is generally similar to the arrangements of Figures 6 and 7, the substation circuits being analogous to the remote station circuits of Figure 7 and the control station circuits to those of Figure 6.

At the substation the initiating relay 400 with its contacts 401—404, the signal-back relay 410 with contacts 411, 412, and the hand-switch 415 with contacts 416, 417 (corresponding respectively to the relays 270, 280 and the switch 305 of Figure 7) are common to all the meters. The selector contacts 342 are connected through contacts 401, 411 to a busbar 374 and through contact 402 to the D. C. busbar 371. The initiating relay 400 is energized from the busbars 370, 371 through the hand-switch contact 416, and makes its own holding circuit at contact 403 in series with the signal-back relay contact 412, the relay 400 also being connected on one side to a busbar 375. The contacts 404, 417 control a connection from the D. C. busbar 370 to the busbar 374. The signal-back relay 410 is connected on one side to the D. C. busbar 370 and on the other to a busbar 376. The busbars 373, 374, 375, 376 are common to all the meters.

Each meter is arranged in the same manner as the meter of Figure 7 and is provided with its own operating relay, the same reference numerals as in Figure 7 being employed for these parts. The busbar 376 is connected through one of the pilot wires 300 and thence through contacts such as 206, 207 (Figure 7) on the distant tap-changing mechanism back to the contacts 301, the co-acting timing device contact 302 being connected to the D. C. busbar 371. The busbar 375 is connected through the over-run contacts 203 to the D. C. busbar 371. The busbar 374 is connected through the zero-interlock contacts 211 to one side of the operating relay 260, the other side of which is connected to the busbar 373 through selector contacts 420 closed only in the selector half-notch position associated with the selected meter.

At the control station the hand-switch 430 with its contact 431 and the initiating relay 435 with contacts 436, 437, 438 are common to all the indicators, the relay 435 being connected on one side to the D. C. busbar 391 and on the other side to a busbar 393 and through the hand-switch contact 431 to the D. C. busbar 390. The selector contacts 332 are connected through contact 436 to a busbar 394 and through contact 438 to the D. C. busbar 391, whilst contact 437 controls a connection from the D. C. busbar 390 to the busbar 394. The busbars 392, 393, 394 are common to all the indicators.

Each indicator is arranged in the same manner as the indicator of Figure 6 and is provided with its own operating relay and indicating lamp, the same reference letters as in Figure 6 being employed for these parts, (the electromagnetic clamp and the release coil 185 together with the corresponding operating relay contact 231, however, being omitted for the sake of simplicity, it being assumed that the pointer 180 is frictionally held and mechanically released). The busbar 393 is connected through the operating relay contact 232 to the D. C. busbar 390. The busbar 394 is connected through the operating relay 230 and the zero-interlock contacts 191 and thence to the busbar 392 through selector contacts 440 closed only in the selector half-notch position corresponding to the particular indicator.

Thus when the selecting apparatus has been operated to bring the selectors into the half-notch position associated with the particular meter and indicator, the selector contacts 332, 440, 342, 420, will be closed as also will the drum contacts 336, 346, the meters switch contact 362 and the meter relay contacts 366, 367. The loop circuit will therefore be complete, this circuit running from the pilot wire 352 through the contact 367, the busbar 373, the selector contacts 420, the operating relay 260 associated with the selected meter, the zero-interlock contacts 211 on the meter, the busbar 374, the contacts 411, 401, 342 and 366, the pilot wire 353, the contacts 336, 332 and 436, the busbar 394, the operating relay 230 associated with the selected indicator, the zero-interlock contacts 191, the selector contacts 440, the busbar 392 and the meters switch contact 362 back to the pilot wire 352. On depression of either hand-switch 415 or 430 and the consequent operation of the initiating relay 400 or 435, this loop circuit will be broken and current will be injected into it (in the manner already described with reference to Figures 6 and 7) to operate the two operating relays 230, 260) and set the timing devices 190, 210 into movement, until the meter reading position is reached, when the signal-back relay 410 will be operated to stop the movement and return the circuits to their normal conditions with the indicator and meter pointers held set in the correct position.

The arrangement of Figure 10, which is concerned with the selective indication of the readings of such meters as ammeters or voltmeters giving continuously variable readings, will now be described. Each meter at the substation and each indicator at the control station is arranged in exactly the same manner as the meter or the indicator of Figure 2 and the same reference numerals as in that figure are employed. As previously mentioned, the polarized relay 380 at the control station is common to all the indicators, and its contacts 381, 382 respectively connect the D. C. busbar 390 to two busbars 395, 396. Two meters and the two corresponding indicators are shown by way of example in Figure 10, and their connections into circuit are controlled by selector contacts. Thus the substation selector contacts 421, 422, 423 are associated with the first meter, and the contacts 424, 425, 426 with the second meter, whilst the control station selector contacts 441, 442 are associated with the first indicator and the contacts 444, 445 with the second indicator. These control station selector contacts control the connections of the indicator clutch coils 56, 57 to the busbars 395, 396. The substation selector contacts 421, 423, 424, 426 similarly control the clutch coil connections to the D. C. busbars 370, 371, whilst the contacts 422, 425 control the connections from the selected metering source 450 or 451 to the operating coil of the corresponding meter as indicated at 452 or 453. Thus the meters themselves are in this case normally disconnected from the metering sources and are only connected thereto by the operation of the selector.

Thus when it is desired to ascertain the condition of a particular metering source, say the source 450, the selectors are brought into the corresponding half-notch position, in which the contacts 341, 421, 422, 423, 331, 441, 442 are closed, as also are the drum contacts 346, 336, the meter relay contacts 366, 367 and the meters switch contact 362. Thus all the circuits are completed in the manner shown in Figure 2, the pilot wire 353 (corresponding to the pilot wire 61 of Figure 2) being connected at the control station through the contacts 336 and 331 to the polarized relay 380 and at the substation through the contacts 366 and 341 to the D. C. neutral busbar 372. The closing of the substation sector contacts 422 will energize the meter coil 452 so that the meter pointer 20 will move from the position in which it was left at the previous indication into the new correct position, the timing devices operating as already described with reference to Figure 2 to reset the corresponding indicator pointer 50 to the new reading position.

With the arrangement of Figure 10 separate reversing clutches and mechanisms driven thereby are required for the individual meters or indicators, but Figure 11 shows a modification in which a single mechanical unit common to all the meters at the substation or to all the indicators at the control station is used. The modification of Figure 11 will now be described in detail.

At the substation a constant speed driving element 460 acts through a reversing clutch 461 controlled by clutch coils 462, 463 to drive a contact arm 464 over a rheostat 465 in circuit with a source of constant E. M. F. 466. The metering sources such as 450, 451 are, as in Figure 10, normally disconnected from the metering circuits and are connected thereto by the selector contacts 422 or 425. In this instance, instead of employing a separate meter for each metering source, all the sources of one kind, such as 450, are connected through their selector contacts to busbars 470, 471 leading to the operating coil 472 of a suitable instrument, which may be an ammeter or a voltmeter or a wattmeter etc. as the case may be. In the example illustrated two such instruments are shown, which for convenience will be assumed to be an ammeter and a voltmeter, the operating coil 472 being that of the ammeter, whilst the voltmeter coil is shown at 482 and is connected to the busbars 480, 481, to which the second metering source 451 is shown as connected. The pointer 473 (or 483) of the ammeter (or of the voltmeter) carries two contacts 474, 475 (or 484, 485) between which is disposed a contact 476 (or 486) on a follower pointer 477 (or 487) driven to follow the movements of the ammeter (or voltmeter) pointer by a coil 478 (or 488). The coils 478 and 488 are connected together on one side and to the contact arm 464, and on their other sides respectively to busbars 479 and 489, which are connected through selector contacts such as 427 and 428 (simultaneously operated with the contacts 422 and 425 respectively) to a busbar 467 leading to one end of the rheostat 465. The pointer contacts 474, 484 are both connected to the clutch coil 463 and thence to the D. C. busbar 371, and the contacts 475, 485 are similarly connected through the clutch coil 462 to the D. C. busbar 370, whilst the follower pointer contacts 476, 486 are connected to the meter relay contact 367.

At the control station a constant speed driving element 490 acts through a reversing clutch 491 controlled by clutch coils 492, 493 to drive a contact arm 494 over a rheostat 495 in circuit with a source of constant voltage 496, one end of the rheostat being connected to a busbar, 497, whilst the contact arm is connected to a busbar 498. The individual indicators are in this case in the form of meters, whose operating coils, such as 500, 501, are energized from the busbars 497, 498 through selector contacts 446, 448. Each indicator pointer is held in position by a clamp electromagnetically released by a coil 502 or 503, which is energized through selector contacts 447 or 449 (operated simultaneously with the contacts 446 or 448) from busbars 505, 506 connected through a further contact 363 on the meters switch 360 to an auxiliary battery 507. The clutch coils 492, 493 are directly energized from the D. C. busbars 390, 391 under the control of the polarized relay contacts 382, 381.

Thus when the selectors are brought into the half-notch position associated with, say, the metering source 450, the contacts 341, 422, 427, 331, 446, 447, 346 336, 366, 367, 362, 363 will be closed, thus operating the coil 502 to release the clamp on the selected indicator, and connecting the metering source 450 with the ammeter coil 472. The ammeter pointer 473 will at once move towards the correct reading position bringing one of its contacts, say 474, into engagement with the follower pointer contact 476. This completes a circuit from the D. C. busbar 371 through the clutch coil 463, the contacts 474, 476, 367, the pilot wire 352, the contact 362, the polarized relay 380, the contacts 331, 336, the pilot wire 353 and the contacts 366, 341 to the D. C. neutral busbar 372. This energizes the clutch coil 463 and also causes the polarized relay 380 to close its contacts 381 and energize the clutch coil 493. The two contact arms 464, 494 are consequently driven in synchronism over the rheostats 465, 495, each arm starting from the position at which it was left at the previous indication. The movement of the contact arm 464 over the rheostat varies the energization of the coil 478, so that the follower pointer 477 follows the movement of the meter pointer 473, the indicator pointer at the control station performing a corresponding movement. These movements continue until the meter pointer 473 comes to rest in the appropriate position, when the operating circuit is broken at contacts 474, 476 and the contact arms 464, 494 come to rest. Any further change in the meter reading whilst the particular metering source remains selected will again set the mechanism in movement until the change has been indicated. When the selectors are moved from the particular half-notch position, the energizing circuits for the ammeter in the substation and for the indicator in the control station are broken, the deenergization of the release coil 502 however causing the clamp to be applied to hold the indicator pointer correctly set. It will be noted that the two contact arms 464, 494 will always occupy corresponding positions, so that the correctness of the indicator readings is ensured.

It will be appreciated that the arrangements above described have been given by way of example only and may be modified within the scope of the invention to suit particular applications thereof.

What we claim as our invention and desire to secure by Letters Patent is:—

1. A remote metering system for obtaining at a control station an indication of the readings of a meter at a remote station, including in combination a device moving over the meter scale at the remote station, an indicator device moving over a corresponding scale at the control station, means for driving the two devices at corresponding speeds, means for starting each device in movement from its zero scale position, a source of electric current in each station, a switch at each station for initiating the energization of the two starting means from such sources whereby the two devices are started in movement simultaneously from their zero scale positions when an indication is desired, means for stopping the two devices simultaneously when the remote station device reaches a scale position corresponding to the meter reading, and means whereby after the desired indication has been given the two devices automatically return to their zero positions where they remain irrespective of any changes in the meter reading until a new indication is initiated.

2. A remote metering system for obtaining at a control station an indication of the readings of a meter at a remote station, including in combination a device moving over the meter scale at the remote station, an indicator device moving over a corresponding scale at the control station, means for driving the two devices at corresponding speeds, means for starting each device in movement from its zero scale position, a source of electric current in each station, a switch at each station for initiating the energization of the two starting means from such sources whereby the two devices are started in movement simultaneously from their zero scale positions when an indication is desired, means tending to prevent the two devices from being started up to give an indication unless both devices are in their zero positions, means for stopping the two devices simultaneously when the remote station device reaches a scale position corresponding to the meter reading, means whereby after the desired indication has been given the two devices automatically return to their zero positions, an indicating member driven over the indicator scale by the indicator device, and means for holding such member in the indicating position when the indicator device returns to its zero position and for releasing such member when an indicating movement is started.

3. A remote metering system for obtaining at a control station an indication of the readings of a meter at a remote station, including in combination a device moving over the meter scale at the remote station, an indicator device moving over a corresponding scale at the control station, means for driving the two devices at corresponding speeds, a local source of electric current at each station, an operating relay at each station, means whereby the energization and deenergization of such relay respectively cause the starting and the stopping of the movement of the adjacent device, a switch at each station for initiating the simultaneous energization of the two operating relays when an indication is required, a signal-back relay in the remote station, means for operating the signal-back relay from the local source of current when the remote station device reaches a scale position corresponding to the meter reading, means whereby the signal-back relay when operated causes the deenergization of the two operating relays, and means whereby after the desired indication has been given the two devices automatically return to their zero positions where they remain irrespective of any changes in the meter reading until a new indication is initiated.

4. A remote metering system for obtaining at a control station an indication of the readings of a meter at a remote station, including in combination a device moving over the meter scale at the remote station, an indicator device moving over a corresponding scale at the control station, synchronously rotating driving elements for the two devices respectively at the two stations, clutches controlling the connections between the devices and their driving elements, coils electromagnetically controlling the clutches, a source of electric current in each station, means provided at both stations for controlling the energization of the clutch coils from such sources whereby the two devices are started simultaneously in movement from their zero scale positions when an indication is desired, means tending to prevent the initial energization of the clutch coils unless both devices are in their zero positions, means for deenergizing the clutch coils and thereby stopping the two devices when the remote station device reaches a scale position corresponding to the meter reading, and means whereby after the desired indication has been given the two devices automatically return to their zero positions where they remain irrespective of any changes in the meter reading until a new indication is initiated.

5. A remote metering system for obtaining at a control station an indication of the readings of a meter at a remote station, including in combination a device moving over the meter scale at the remote station, an indicator device moving over a corresponding scale at the control station, synchronously rotating driving elements for the two devices respectively at the two stations, clutches controlling the connections between the devices and their driving elements, coils electromagnetically controlling the clutches, a source of electric current in each station, a switch at each station for initiating the energization of the clutch coils from such sources whereby the two devices are started in movement simultaneously from their zero scale positions, a signal-back relay at the remote station, means for operating such relay when the remote station device reaches a scale position corresponding to the meter reading, means whereby the signal-back relay when operated deenergizes the clutch coils and thereby stops the two devices, and means whereby after the desired indication has been given the two devices automatically return to their zero positions where they remain irrespective of any changes in the meter reading until a new indication is initiated.

6. A remote metering system for obtaining at a control station an indication of the readings of a meter at a remote station, including in combination a device moving over the meter scale at the remote station, an indicator device moving over a corresponding scale at the control station, means for driving the two devices at corresponding speeds, a local source of electric current at each station, an operating relay at each station, means whereby the energization and deenergization of such operating relay respectively cause the starting and the stopping of the movement of the adjacent device, a normally closed loop circuit connecting the two stations and including the two operating relays, means at each station for injecting current from the local source into the loop circuit when an indication is required and thereby energizing the two operating relays, means tending to prevent the initial energization of the two operating relays unless both devices are in their zero positions, a signal-back relay in the remote station, means for operating the signal-back relay from the local source when the remote station device reaches a scale position corresponding to the meter reading, means whereby the signal-back relay when operated breaks the loop circuit and thereby deenergizes the two operating relays, and means whereby after the desired indication has been given the two devices automatically return to their zero positions where they remain irrespective of any changes in the meter reading until a new indication is initiated.

7. A remote metering system for obtaining at a control station selective indications of the readings of a group of meters at a remote station, including in combination a device associated with each meter at the remote station moving over the meter scale, an indicator device associated with each remote station meter moving over a corresponding scale at the control station, synchronously rotating driving elements for each remote station device and the corresponding indicator device, clutches controlling the connections between the devices and their driving elements, a signal-back relay in the remote station common to all the meters, two selectors one at each station, means whereby the selectors can be caused to move into a position in which they associate an individual remote meter with its corresponding indicator device and with the common signal-back relay, means for electrically controlling the clutches associated with the selected devices whereby the two devices are started simultaneously in movement from their zero scale positions, means tending to prevent the two devices from being started up unless both devices are in their zero positions, means whereby the signal-back relay is operated when the selected remote station device reaches a scale position corresponding to the meter reading, means whereby the operation of the signal-back relay causes the deenergization of the clutches and thereby stops the two devices, means whereby the two devices automatically return to their zero positions when the indication has been given, an indicating member associated with each indicator device and driven thereby over the indicator scale, and means for holding such member in the indicating position when the indicator device returns to its zero position and for releasing such member when an indicating movement is started.

8. A remote metering system for obtaining at a control station selective indications of the readings of a group of meters at a remote station, including in combination a device associated with each meter at the remote station moving over the meter scale, an indicator device associated with each remote station meter moving over a corresponding scale at the control station, means for driving the meter device and the associated indicator device at corresponding speeds, an operating relay associated with each meter device and with each indicator device, means whereby the energization and deenergization of such relay respectively cause the starting and the stopping of the associated device, two selectors one at each station, pilot wires connecting the two stations, means whereby the selectors can be caused to select an individual meter device and its corresponding indicator device and to connect the operating relays associated with such devices in a closed loop circuit including the pilot wires, a local source of electric current at each station, means at each station for injecting current from the local source into the loop circuit when an indication is required and thereby energizing the two operating relays, means tending to prevent the initial energization of the operating relays unless the associated devices are both in their zero positions, a signal-back relay in the remote station common to all the meters, means whereby the signal-back relay is operated when the selected remote station device reaches a scale position corresponding to the meter reading, means whereby the signal-back relay when operated breaks the loop circuit thereby de-energizing the two operating relays and stopping the two devices, and means whereby the two devices automatically return to their zero positions after the desired indication has been given.

9. A remote metering system for obtaining at a control station an indication of the readings of a meter at a remote station, including in combination a device moving over the meter scale at the remote station, an indicator device moving over a corresponding scale at the control station, means for driving the two devices at corresponding speeds, a local source of electric current at each station, an operating relay at each station, means whereby the energization and deenergization of such operating relay respectively cause the starting and stopping of the movement of the adjacent device, a normally closed loop circuit connecting the two stations and including the two operating relays, means at each station for injecting current from the local source into the loop circuit when an indication is required and thereby energizing the two operating relays, contacts at each station in the loop circuit closed only when the corresponding device is in its zero position, contacts on each operating relay in parallel with such zero-interlock contacts whereby the loop circuit remains closed when the two devices leave their zero positions, means for breaking the loop circuit when the remote station device reaches a scale position corresponding to the meter reading whereby the two operating relays are deenergized, and means whereby after the desired indication has been given the two devices automatically return to their zero positions where they remain irrespective of any changes in the meter reading until a new indication is initiated.

10. A remote metering system for obtaining at a control station an indication of the readings of a meter at a remote station, including in combination a device moving over the meter scale at the remote station, an indicator device moving over a corresponding scale at the control station, means for driving the two devices at corresponding speeds, an alternating current channel of communication connecting the two stations, means provided both at the control station and at the remote station for transmitting over the alternating current channel of communication to the other station a current of one frequency for effecting simultaneous starting of the two devices from their zero scale positions when an indication is desired, means for transmitting a current of another frequency over the alternating current channel of communication for stopping the two devices simultaneously when the remote station device reaches a position corresponding to the meter reading, and means whereby after the desired indication has been given the two devices automatically return to their zero positions where they remain irrespective of any changes in the meter reading until a new indication is initiated.

11. A remote metering system for obtaining at a control station an indication of the readings of a meter at a remote station, including in combination a device moving over the meter scale at the remote station, an indicator device moving over a corresponding scale at the control station, means for driving the two devices at corresponding speeds, an alternating current channel of communication connecting the two stations, two alternating generators one at each station operating at the same frequency, a receiver at each station tuned to such frequency and connected to the alternating current channel of communication, means provided at each station for connecting the generator to the alternating current channel of communication when an indication is desired whereby the two receivers are operated and cause the two devices to start simultaneously in movement from their zero scale positions, a second alternating current generator at the remote station operative at a different frequency, a second receiver at the control station tuned to such frequency, means whereby when the remote station device reaches a scale position corresponding to the meter reading such device is stopped and the second generator at the remote station is connected to the alternating current channel of communication whereby the second control station receiver is operated to stop the movement of the indicator device, and means whereby after the desired indication has been given the two devices automatically return to their zero positions where they remain irrespective of any changes in the meter reading until a new indication is initiated.

12. A remote position indicating system for obtaining at a control station an indication of the readings of a meter which registers at a remote station the position of a multi-position apparatus such as a transformer tap-changing apparatus, including in combination a device moving over the meter scale at the remote station, an indicator device moving over a corresponding scale at the control station, means for driving the two devices at corresponding speeds, means operable at will at the control station for starting the two devices simultaneously in movement from their zero scale positions, at least one control switch at the remote station for controlling the actuation of the multi-position apparatus, means whereby the operation of such control switch to effect a change of position of the apparatus prepares a circuit for initiating the simultaneous starting of the two devices from their zero positions, means for completing such circuit when the apparatus has moved into its new position whereby the two devices are started up, means for stopping the two devices simultaneously when the remote station device reaches a scale position corresponding to the meter reading, and means whereby after the desired indication has been given the two devices automatically return to their zero positions.

13. A remote position indicating system for obtaining at a control station an indication of the readings of a meter which registers at a remote station the position of a multi-position apparatus such as a transformer tap-changing apparatus, including in combination a device moving over the meter scale at the remote station, an indicator device moving over a corresponding scale at the control station, means for driving the two devices at corresponding speeds, a source of electric current in the remote station, an initiating circuit which when closed and connected to such source causes the two devices to start simultaneously in movement from their zero positions, at least one control switch for controlling the changes of position of the multi-position apparatus, auxiliary contacts in the initiating circuit which are closed when the multi-position apparatus is occupying any one of its positions but are open during movement of the apparatus from one position to another, means whereby operation of the control switch causes the source of current to be connected to the initiating circuit, an auxiliary relay which acts immediately on operation of the control switch to open a contact in the initiating circuit but allows such contact to close again when the apparatus has moved from its position whereby the initiating circuit is completed by the auxiliary contacts when the apparatus reaches its new position, means for stopping the two devices simultaneously when the remote station device reaches a scale position corresponding to the meter reading, and means whereby after the desired indication has been given the two devices return automatically to their zero positions.

14. A remote position indicating system for obtaining at a control station an indication of the readings of a meter which registers at a remote station the position of a multi-position apparatus such as a transformer tap-changing apparatus, including in combination a device moving over the meter scale at the remote station, an indicator device moving over a corresponding scale at the control station, synchronously rotating driving elements for the two devices respectively at the two stations, clutches controlling the connections between the devices and their driving elements, coils electro-magnetically controlling the clutches, an initiating circuit for controlling the energization of the clutch coils whereby the two devices are simultaneously started in movement from their zero scale positions when the circuit is completed, means tending to prevent the devices from being started up unless both devices are in their zero positions, at least one control switch for controlling the changes of position of the multi-position apparatus, means whereby operation of such control switch prepares the initiating circuit, means whereby the initiating circuit is completed when the apparatus has moved into its new position, means for breaking the initiating circuit when the remote station device reaches a scale position corresponding to the meter reading thereby stopping the two devices simultaneously, and means whereby after the desired indication has been given the two devices return automatically to their zero positions.

15. A remote position indicating system for obtaining at a control station an indication of the readings of a meter which registers at a remote station the position of a multi-position apparatus such as a transformer tap-changing apparatus, including in combination a device moving over the meter scale at the remote station, an indicator device moving over a corresponding scale at the control station, means for driving the two devices at corresponding speeds, a local source of current at each station, an operating relay at each station whose energization and de-energization respectively cause the starting and the stopping of the movement of the adjacent device, a normally closed loop circuit connecting the two stations and including the two operating relays, means operable at will at the control station for injecting current into the loop circuit when an indication is required and thereby energizing the two operating relays, means tending to prevent the initial energization of the two operating relays unless both devices are in their zero positions, at least one control switch for controlling the actuation of the multi-position apparatus, means whereby on operation of such control switch to effect a change of position of the apparatus the loop circuit is broken but the local source of current in the remote station is connected to one side of such circuit, means whereby the completion of the movement of the apparatus into the new position causes the source of current to be connected to the other side of the loop circuit and thereby energizes the two operating relays, a signal-back relay in the remote station, means whereby the signal-back relay acts to break the loop circuit when the remote station device reaches a scale position corresponding to the meter reading and thereby to de-energize the two operating relays, and means whereby the two devices automatically return to their zero positions after the desired indication has been given.

16. A remote position indicating system for obtaining at a control station an indication of the readings of a meter at a remote station for registering the position of a multi-position apparatus such as a transformer tap-changing apparatus distant from the meter, including in combination auxiliary contacts on the multi-position apparatus which are closed respectively in the individual positions of such apparatus, fixed contacts on the meter in scale positions corresponding to the positions of the multi-position apparatus and respectively connected to the auxiliary contacts, a feeling device moving over the meter scale and cooperating with the fixed meter contacts, an indicator device moving over a corresponding scale at the control station, means for driving the two devices at corresponding speeds, means for starting the two devices simultaneously in movement from their zero positions when an indication is desired, a signal-back relay energized over a circuit including the auxiliary contacts and the feeling device and meter contacts whereby such relay is operated when the feeling device comes into engagement with the meter contact corresponding to the position of the multi-position apparatus, means whereby the operation of the signal-back relay causes the two devices to be stopped simultaneously, and means whereby the devices automatically return to their zero positions after the desired indication has been given.

17. A remote position indicating system for obtaining at a control station an indication of the readings of a meter at a remote station for registering the position of a multi-position apparatus such as a transformer tap-changing apparatus distant from the meter, including in combination auxiliary contacts on the multi-position apparatus which are closed respectively in the individual positions of such apparatus, fixed contacts on the meter in scale positions corresponding to the positions of the multi-position apparatus and respectively connected to the auxiliary contacts, a feeling device moving over the meter scale and cooperating with the fixed meter contacts, an indicator device moving over a corresponding scale at the control station, synchronously rotating driving elements for the two devices, clutches controlling the connections between the devices and their driving elements, coils electro-magnetically controlling the clutches, means both at the control station and at the remote metering station for controlling the energization of the clutch coils whereby the two devices are started simultaneouly in movement from their zero positions, means tending to prevent the initial energization of the clutch coils unless the two devices are both in their zero positions, a signal-back relay energized over a circuit including the auxiliary contacts and the feeling device and meter contacts whereby such relay is operated when the feeling device comes into engagement with the meter contact corresponding to the position of the multi-position apparatus, means whereby the operation of the signal-back relay causes the de-energization of the clutch coils and thereby stops the two devices simultaneously, and means whereby the two devices automatically return to their zero positions after the desired indication has been given.

18. A remote position indicating system for obtaining at a control station an indication of the readings of a meter at a remote station for registering the position of a multi-position apparatus such as a transformer tap-changing apparatus distant from the meter, including in combination auxiliary contacts on the multi-position apparatus which are closed respectively in the individual positions of such apparatus, fixed contacts on the meter in scale positions corresponding to the positions of the multi-position apparatus and respectively connected to the auxiliary contacts, a feeling device moving over the meter scale and cooperating with the fixed meter contacts, an indicator device moving over a corresponding scale at the control station, means for driving the two devices at corresponding speeds, an alternating current channel of communication between the control station and the remote metering station, means for transmitting over the alternating current channel of communication a current of one frequency for effecting simultaneous starting of the two devices from their zero positions when an indication is desired, a signal-back relay energized over a circuit including the auxiliary contacts and the feeding device and meter contacts whereby such relay is operated when the feeling device comes into engagement with the meter contact corresponding to the position of the multi-position apparatus, means whereby the operation of the signal-back relay causes a current of another frequency to be transmitted over the alternating current channel of communication for stopping the two devices simultaneously, and means whereby after the desired indication has been given the two devices automatically return to their zero positions.

BRUCE HAMER LEESON.
JAMES ALFRED HARLE.
DOUGLAS EDWARD LAMBERT.